(12) United States Patent
Svantesson et al.

(10) Patent No.: US 6,715,829 B2
(45) Date of Patent: Apr. 6, 2004

(54) HEAD-REST

(75) Inventors: Ander Svantesson, Tollered (SE); Karl-Gunnar Lindblad, Vårgårda (SE)

(73) Assignee: Autoliv Development AB, Vargarda (SE)

( * ) Notice: Subject to any disclaimer, the term of this patent is extended or adjusted under 35 U.S.C. 154(b) by 69 days.

(21) Appl. No.: 09/881,064

(22) Filed: Jun. 15, 2001

(65) Prior Publication Data

US 2002/0043858 A1 Apr. 18, 2002

(30) Foreign Application Priority Data

Jun. 15, 2000 (GB) ............................... 0014699
Jul. 5, 2000 (GB) ............................... 0016575

(51) Int. Cl.[7] ............................................. B60N 2/42
(52) U.S. Cl. ........................................... 297/216.12
(58) Field of Search ............................. 297/391, 404, 297/408, 216.12, 216.1

(56) References Cited

U.S. PATENT DOCUMENTS 3,838,870 A * 10/1974 Hug
5,772,280 A    6/1998 Massara
5,772,281 A    6/1998 Massara
6,079,776 A *  6/2000 Breitner et al.
6,082,817 A *  7/2000 Muller
6,213,548 B1 * 4/2001 Van Wynsberghe et al.

FOREIGN PATENT DOCUMENTS

| DE | 3900495 | 7/1990 | |
|----|---------|--------|---|
| EP | 0 593 845 | 4/1993 | |
| EP | 0 925 997 | 6/1999 | |
| EP | 0 974 484 | 1/2000 | |
| GB | 2 347 078 | 8/2000 | |
| JP | 08072660 A * | 3/1996 | ........... B60R/21/22 |

* cited by examiner

*Primary Examiner*—Milton Nelson, Jr.
(74) *Attorney, Agent, or Firm*—Venable, LLP; Catherine M. Voorhess

(57) ABSTRACT

A head-rest arrangement for a motor vehicle includes a rear part and a front part mounted on the rear part by a parallel arm linkage. A spring biases the front part forwardly. A releasable catch holds the two parts together until a sensor senses a rear impact. The front part is movable forwardly relatively freely once the catch is released. Any subsequent rearward movement of the front part is resisted by an energy-absorbing element which converts energy to a form no longer available to bias the front part of the head-rest forwardly.

14 Claims, 7 Drawing Sheets

HEAD-REST

CROSS-REFERENCE TO RELATED APPLICATION

This application claims the priority of British Application Nos. 0014699.3 filed Jun. 15, 2000 and 0016575.3 filed Jul. 5, 2000, the disclosures of both applications being incorporated herein by reference.

BACKGROUND OF THE INVENTION

The present invention relates to a head-rest, and more particularly relates to a head-rest for a vehicle seat.

The present invention seeks to provide a head-rest for a vehicle seat, and more particularly seeks to provide a head-rest adapted to respond to a rear impact of the vehicle in which the vehicle seat is mounted, in order to minimise the risk of whiplash injury to the occupant of the seat.

It is now known that when a vehicle is subjected to a rear impact, the occupant of a seat within the vehicle, such as, for example, the driver of the vehicle, may suffer from so-called "whiplash" injuries which may be relatively severe, even if the rear impact is only a low velocity impact.

The reason for this is that, when a rear impact occurs to a stationary vehicle, for example, if a following vehicle fails to brake and runs into the back of the stationary vehicle, the stationary vehicle is given a very sudden acceleration. Consequently the floor pan and the seats of the vehicle tend to move forwardly very quickly. The posterior and torso of an occupant of a seat in the vehicle also tend to start moving forward very swiftly, since they are moved forwardly by their engagement with a seat in the vehicle. However, typically the head of an occupant of the vehicle is not in contact with anything and thus, during the initial stages of the rear impact, the torso and lower part of the neck of the occupant of the vehicle tend to move forwardly, whilst the head tends to remain in its initial position.

Of course, the forward movement of the lower part of the neck causes the neck itself to enter a curved state, and then, when the neck is in the curved state, the continuing forward movement of the torso of the occupant of the seat tends to begin to impart a forward motion to the head of the occupant. However, this forward motion is associated with a twisting motion of the head. The head is then given a forward motion purely as a consequence of the forward movement of the torso of the occupant of the vehicle.

It is this chain of events that leads to the "whiplash" injury.

The present invention seeks to provide the head-rest which will reduce the risk of "whiplash" injuries occurring.

SUMMARY OF THE INVENTION

According to this invention there is provided a head-rest arrangement for a seat of the motor vehicle, the head-rest comprising a rear part adapted to be mounted on the seat, and a front part, the front part being releasably connected to the rear part and being adapted to move forwardly relative to the rear part, in response to a signal, and means being provided to resist subsequent rearward movement of the front part, relative to the rear part, once the front part has moved forwardly relative to the rear part, the means to resist subsequent rearward movement being adapted to convert energy to a form in which the energy is no longer available to bias the front part forwardly again.

Preferably the front part of the head-rest is releasably connected to the rear part by releasable connection means responsive to said signal, means being provided to bias the front part forwardly relative to the rear part.

Conveniently the front part is connected to the rear part by means of a mechanical linkage incorporating two elongate link elements, each link element having one end thereof pivotally connected to the rear part of the head-rest and each link element having the other end thereof pivotally connected to the front part of the head-rest.

Advantageously the link elements are initially substantially parallel.

Preferably the means to bias the front part of a head-rest forwardly comprise a resilient element extending between the rear part of the head-rest and the front part of the head-rest.

Conveniently the resilient element is in the form of a spring.

Advantageously the resilient element extends between the point of pivotal connection of one link element and the rear part of the head-rest, and the point of pivotal connection between the other link element and the front part of the headrest.

In one embodiment the means to resist rearward movement comprise a deformable member, the deformable member being adapted to be deformed in response to rearward movement of the front part of the head-rest subsequent to the initial forward movement of the front part of the head-rest.

Conveniently the deformable member comprises an elongate member, part of the deformable member surrounding, or partly surrounding guide means mounted on one part of the head-rest, another part of the deformable member engaging retaining means provided on the other part of the head-rest.

Advantageously guide means comprise means defining an outer surface which is of at least part-circular form, around which the deformable member passes, and the retaining means comprise means adapted releasably to retain part of the deformable member.

Preferably the retaining means comprise a pivotally mounted element defining a passage therethrough, and guide means, the element being associated with means providing a rotational bias, the arrangement being such that movement of the deformable member through the passage tends to rotate the element to such a position that the guide means engage the deformable member to guide the deformable member through the passage, and movement in the opposite direction facilitates a rotational movement of the blocking element to a position in which there is frictional engagement between the deformable member and the passage.

In one embodiment the means providing a rotational bias comprise a spring extending from the element to a hook.

In another embodiment the means providing a rotational bias comprise a spring within a bore in the element, one end of the spring engaging the deformable member.

In an alternative embodiment the means adapted to absorb energy comprise a hydraulic shock-absorber.

Conveniently means are provided to restrict the degree of forward movement of the front part of the head-rest.

Advantageously a sensor is provided to generate said signal in response to a rear impact. Such a sensor may be a sensor adapted to generate an electrical signal or may be a sensor adapted to generate a mechanical signal such as a pendulum device or a so-called "standing man" device.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
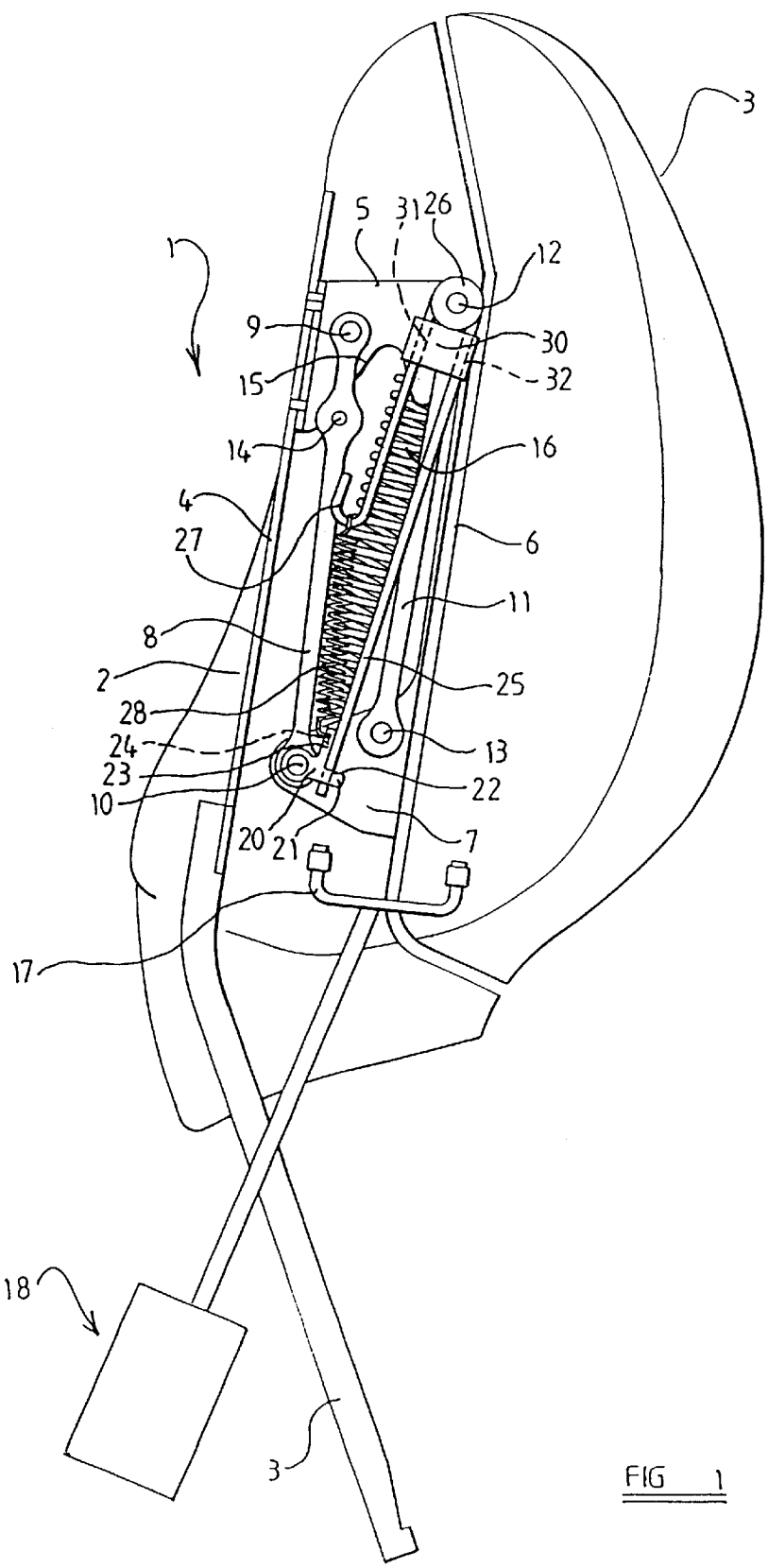
FIG. 1 is a schematic side view of a head-rest in accordance with the invention in an initial state.

Referring initially to FIG. 1 of the accompanying drawings, a headrest 1, in accordance with the present invention, is adapted to be mounted in position on a vehicle seat. The head-rest 1 comprises a rear support portion 2 having a pair of depending support legs 3 (only one of which is shown), the support legs being adapted to be received within appropriate sockets provided on the back-rest of a vehicle seat.

The rear part 2 of the head-rest supports a padded front part 3, the padded front part 3 being adapted to be located immediately behind the head of an occupant of the seat.

The rear support portion 2 of the head-rest incorporates a mounting plate 4 which supports, towards its upper end, a forwardly directed support plate 5.

The front part 3 of the head-rest includes a support plate 6 which carries a rearwardly directed support plate 7.

A parallel motion linkage is provided which connects the support plate 5 provided on the rear support portion 2 of the head-rest and the support plate 7 provided on the front part 3 of the head-rest. The parallel motion linkage comprises a first rigid elongate arm 8, the upper end of which has a pivotal connection 9 to the support plate 5 carried by the rear support portion 2 of the head-rest, and the lower end of which has a pivotal connection 10 to the support plate 7 carried by the front part 3 of the head-rest. The parallel motion linkage incorporates a second elongate rigid arm 11, the upper end of which has pivotal connection 12 to the support plate 5 carried by rear support portion 2 of the head-rest and the lower end of which has a pivotal connection 13 to the support plate 7 carried by the front part 3 of the head-rest. The two arms 8 and 11 are substantially parallel in an initial condition of the head-rest as shown in FIG. 1.

The arm 8 carries a projecting pin 14 which is received in an inverted substantially "V"-shaped recess formed in the lower edge of the support plate 5 carried by the rear support 2 of the head-rest. The function of the pin 14 and its co-operation with the recess 15 will be described hereinafter.

A helical compression spring 16 is provided, one end of which is connected to the pivotal connection 12 between the upper end of the arm 11 and the support plate 5, and the other end of which is connected to the pivotal connection 10 between the lower end of the arm 8 and the support plate 7. The effect of the spring is to apply a bias to the pivotal linkage constituted by the arms 8 and 11 tending to move the front part 3 of the head-rest forwardly relative to the rear support portion 2 of the head-rest.

A retaining catch 17 is provided which serves to retain the front part 3 of the head-rest in a predetermined initial position, as illustrated, relative to the rear support portion of the head-rest. The catch 17 is associated with a sensor 18, which is adapted to sense a rear impact of a motor vehicle in which the head-rest is mounted, the sensor being adapted to release the catch 17. The sensor 18 may generate an electrical signal which actuates the catch, or may be a mechanical device, such as a pendulum device or a "standing man" device which provides a mechanical signal to release the catch.

It will be appreciated that when the catch 17 is released, the front part of the head-rest 3 will move forwardly relative to the rear support portion 2 of the headrest, being guided by the parallel motion linkage constituted by the arms 8 and 11, under a resilient bias provided by the spring 16.

A mechanism is provided, which will now be described, which permits the above-mentioned forward movement of the front part 3 of the head-rest relative to the rear portion 2 of the head-rest, while resisting any subsequent rearward motion of the front part 3 of the head-rest due to a force applied to the front part 3 of the headrest by the head of the occupant of the seat on which the head-rest is mounted, converting a substantial part of the energy applied to the front part of the head-rest by the head of the occupant to a form of energy which is not subsequently available to bias the front part of the head-rest forwardly again.

The pivotal connection 10 between the lower end of the arm 8 and the support plate 7 provided on the front part 3 of the head-rest is provided with a blocking element 20 which can rotate about the axis of the pivotal connection 10. The blocking element 20 is provided with an initially substantially horizontally extending lug 21 which defines, therein, a vertically extending generally cylindrical passage 22. The element 20 is also provided with an upstanding finger 23 provided with an aperture 24. The finger 23 extends parallel with the passage 22 with a surface of the finger substantially in alignment with the side wall of the passage 22. An elongate rod 25 formed of a malleable metal is provided, the rod having a cross-section generally equivalent to the cross-section of the passage 22 formed in the lug 21. The rod is an elongate deformable member. The lower end of the rod 25 passes through the passage 22 and is received as a sliding fit therein.

The rod 25 extends to and partly surrounds a guide element 26 which, in the described embodiment, is mounted on the pivotal connection 12 between the upper end of the arm 11 and the support plate 5 provided on the rear part 2 of the head-rest. In the illustrated embodiment, the guide element 26 is in the form of a rotatably mounted roller 26, the radial outer surface of the roller 26 being provided with a groove adapted to receive the rod 25. The other end of the rod 25 extends downwardly, parallel with the part of the rod 25 which extends from the element 20 to the guide roller 26, terminating with a hook 27. The hook 27 is connected, by means of a spring 28, to the aperture 24 provided on the up-standing finger 23 on the blocking element 20.

A guide block 30 is provided adjacent the roller 26. The part of the rod which extend away from the roller 26 pass through bores provided in the guide block. The rod extends freely through one bore 31, while being secured to the block in the region of the other bore 32. The block ensures that the rod is drawn past the roller, with a substantial deformation of the rod, when a force is applied to the rod.

The described apparatus has the initial condition as shown in FIG. 1, and it is to be appreciated that in this condition the spring 28 tends to impart a rotated bias to the element 20 which will tend to move the lug 21 to a position in which the opposed side walls of the passage 22 formed in the lug 21 frictionally engage the exterior surface of the lower part of the rod 25.

In the event that the catch 17 is released, the bias provided by the spring 16 will tend to move the point of pivotal connection 10 between the lower end of the arm 8 and the support 7 provided on the front part of the head-rest towards the pivotal connection 12 between the upper end of the arm 11 and the support plate 5 carried by the rear portion 2 of the head-rest. This will cause the parallel linkage to move such that the forward part of the head-rest moves forwardly. During this forward movement of the head-rest the lower part of the rod 25 will tend to move downwardly through the passage 22 provided in the lug 21. Any frictional engagement between the rod 25 and the side walls of the passage 22 will tend to move the element 20 rotationally in a clockwise direction (as shown) about the pivotal connection 10, thus bringing the upstanding finger 23 generally into contact with the lower part of the rod 25 above the aperture 22. The finger 23 acts to guide the rod into alignment with the passage 22. The lower part of the rod 25 will, as a consequence of the design of the element 20, be brought into alignment with the axis of the passage 22, and will slide freely through the passage 22.

Figure 2:
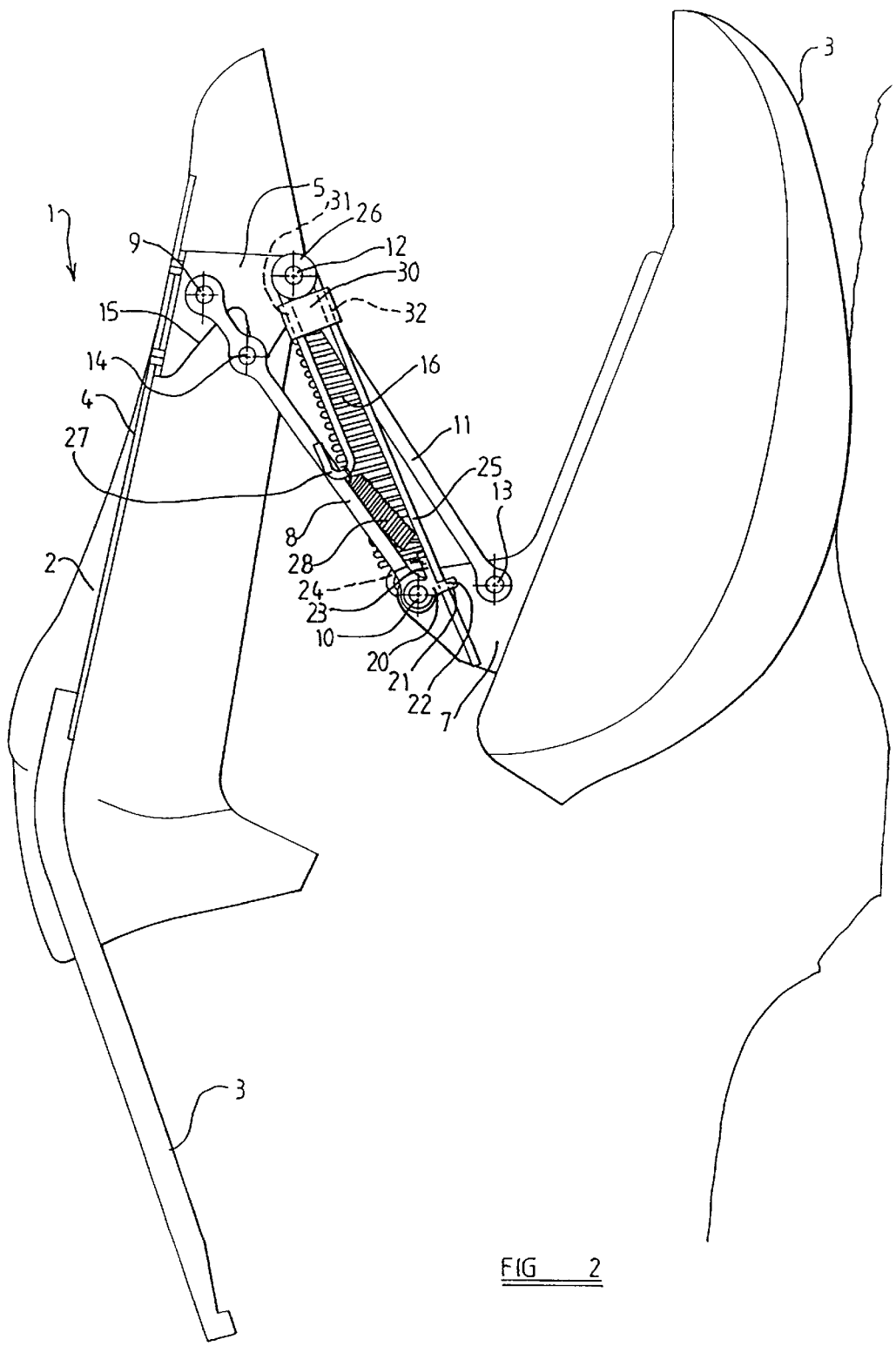
FIG. 2 is a view corresponding to FIG. 1 illustrating the head-rest of FIG. 1 in an initial stage of an accident situation.

Thus, under the influence of the spring 16, the front part 3 of the headrest will move relatively swiftly forwardly relative to the rear portion 2 of the headrest 1 to the position illustrated in FIG. 2. It is to be appreciated that during this movement of the pivotal linkage, the transverse pin 14 provided on the arm 8 has traversed the inverted "V"-shaped recess 15 formed in the lower edge of the plate 5 and has come into engagement with the far side of the inverted "V"-shaped recess 15. The engagement of the pin 14 with the far side of the recess 15 will prevent further forward movement of the front part 3 of the head-rest. At this stage it is to be appreciated that the pin 14 could be accommodated within an appropriately shaped slot formed within the mounting plate 5, which would replace the inverted "V"-shaped recess 15.

The front part 3 of the head-rest is thus moved to a position in which the front part of the head-rest lies immediately adjacent the back of the head of the occupant of the seat. Should the head of the occupant of the seat move in such a way that it implies a rearwardly directed force to the front part of the head-rest, the front part of the head-rest will begin to move rearwardly against the bias provided by the spring 16. As the front part of the head-rest moves rearwardly, as a consequence of the anti-clockwise rotational bias applied to the blocking element 20 by the spring 28, the passage 22 will become jammed relative to the rod 25 (in the manner of a drawer partly extended from a chest of drawers) so that the blocking element 20 becomes frictionally engaged with the lower part of the rod 25 (in the manner of a drawer becoming engaged with the slot in which it is received in a chest of drawers when the drawer is partially withdrawn from the chest-of-drawers). The reason for this is that during the rearward movement of the front part 3 of the head-rest, the part of the rod 25 received in the passage 22 and the lug 21 is moving upwardly, thus encouraging the blocking element 20 to rotate in an anti-clockwise direction under the bias of the spring 28. As soon as there is frictional engagement (with the chest-of-drawers effect, as mentioned above), between the blocking element 20 and the rod 25, the element 20 will tend to rotate even further in the anti-clockwise direction, thus enhancing the described effect. As the front part 3 of the head-rest continues to move rearwardly, the part of the rod 25 engaged by the blocking element 20 is drawn downwardly, thus causing part of the metal rod 25 to be drawn past the guide roller 26, with a consequent deformation of the rod 25 as it moves past the roller 26. This deformation absorbs energy and converts the energy directly to heat. This energy is not subsequently available to apply a further forward bias to the front part of the headrest. As the rod 25 is drawn past the roller, the rod is guided, relative to the peripheral groove provided on the roller 26, by the guide element 30. The two bores in the guide element 30 that receive the rod 25 are aligned with the peripheral groove in the roller 26. This also serves to absorb energy which is then no longer available for re-use.

Figure 3:
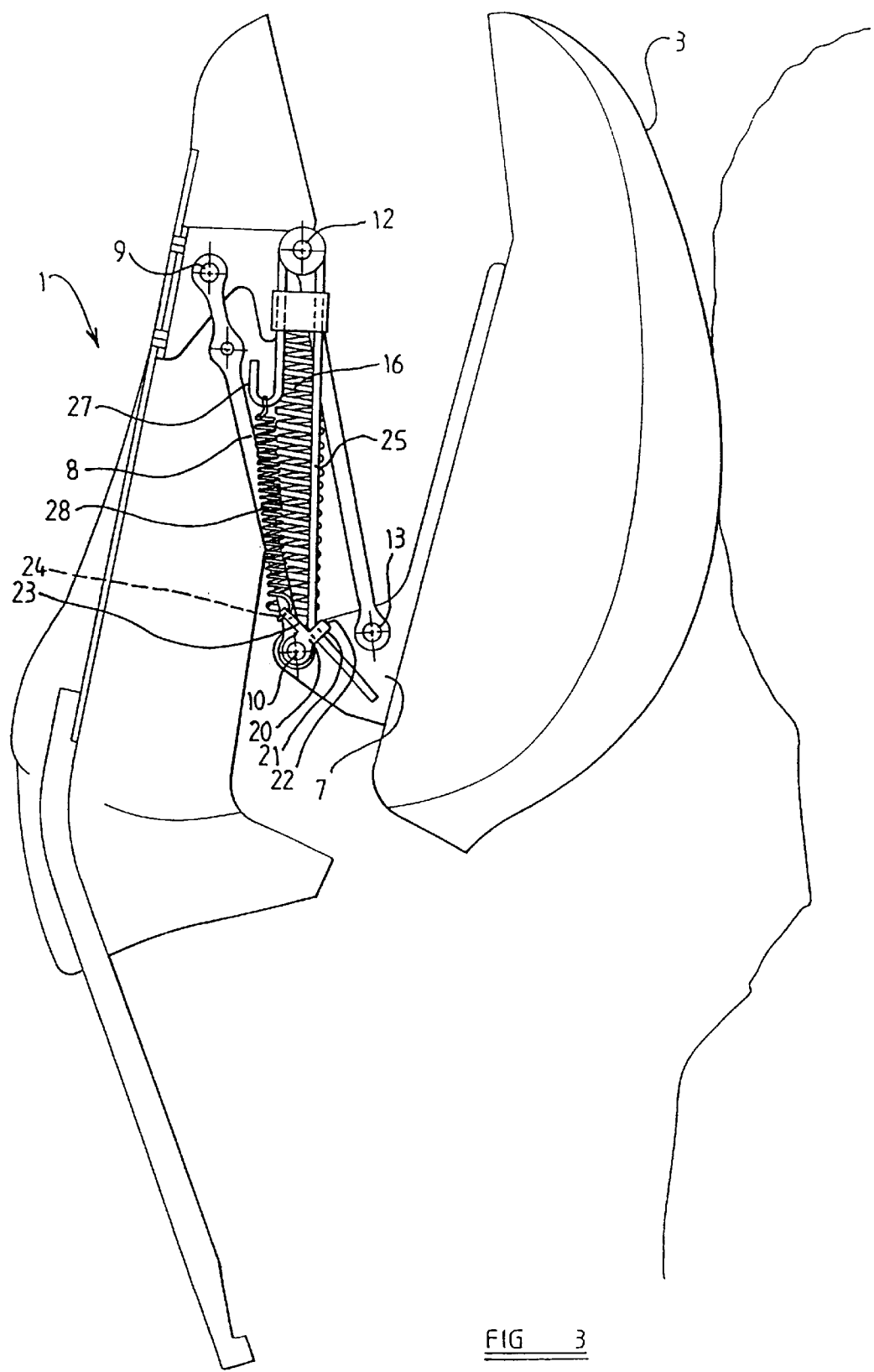
FIG. 3 is a view corresponding to FIG. 2 illustrating the head-rest to FIG. 1 in a subsequent stage during an accident situation.

The front part 3 of the head-rest is thus moved rearwardly towards the position illustrated in FIG. 3. It can be seen that not only has the rod 25 been deformed as it passes the roller 26, but it has also been bent in the region of the blocking element 20.

It is thus believed the head-rest of FIGS. 1 to 3 of the present invention may, in an accident situation, provide an enhanced degree of protection for the head of an occupant of a vehicle seat provided with the head-rest, since the front part of the head-rest will, in an accident situation, move to a position in which it lies immediately adjacent the rear part of the head of the occupant of the seat, and if the head of the occupant of the seat moves rearwardly, that rearward movement will be permitted, whilst a substantial part of the energy applied to the head-rest will be absorbed, by the described energy absorber, and converted into a form of energy no longer available to apply a forward bias to the front part of the head-rest. Although the front part of the head-rest will still be biased forwardly by the spring 16, this biasing force will not, it is envisaged, be sufficient to cause serious problems of "bounce" which might otherwise arise. If all of the energy, or a substantial part of the energy, applied to the front part of the head-rest by the head of the occupant of the seat were converted to an energy form available to bias the front part of the head-rest forwardly again (for example, the simple compression of the spring), then there would be a potential problem of "bounce".

Figure 4:
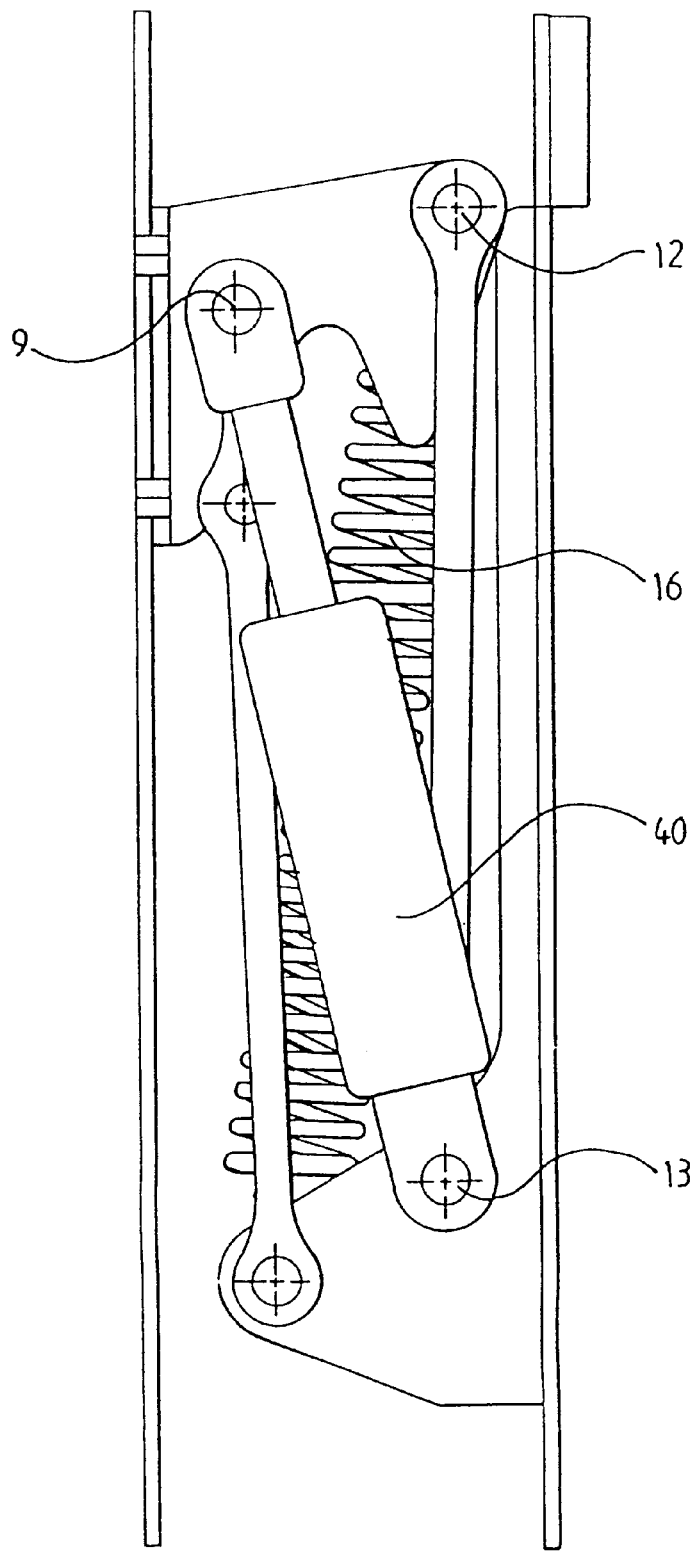
FIG. 4 is a view of part of an alternative embodiment of the invention in an initial stage.

FIG. 4 illustrates a modified embodiment of the invention which, in many respects, is similar to the embodiment of FIGS. 1 to 3. Like parts are identified by like references, and will not be re-described.

In the embodiment the energy-absorbing arrangement does not comprise a deformable bar, but instead is constituted by a hydraulic shock-absorber 40 connected between the point of pivotal connection 9 between the upper end of the arm 8, and the support plate 5, carried by the rear part 2 of the head-rest, and the point of pivotal connection 13 between the lower end of the arm 11 and the support plate 7 carried by the front part 3 of the head-rest.

Figure 5:
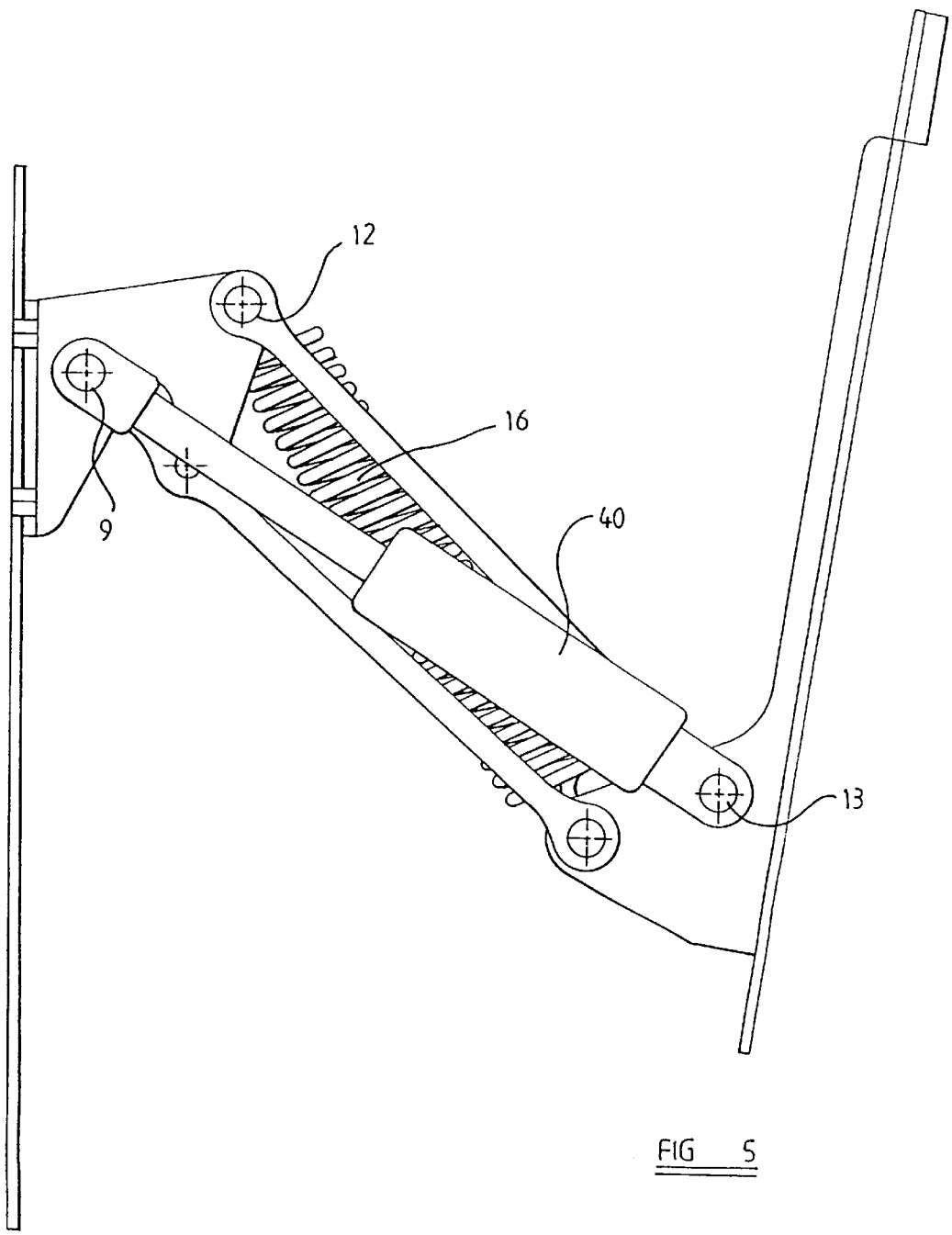
FIG. 5 is a view corresponding to FIG. 4 showing the illustrated arrangement during an initial stage of an accident situation.
Figure 6:
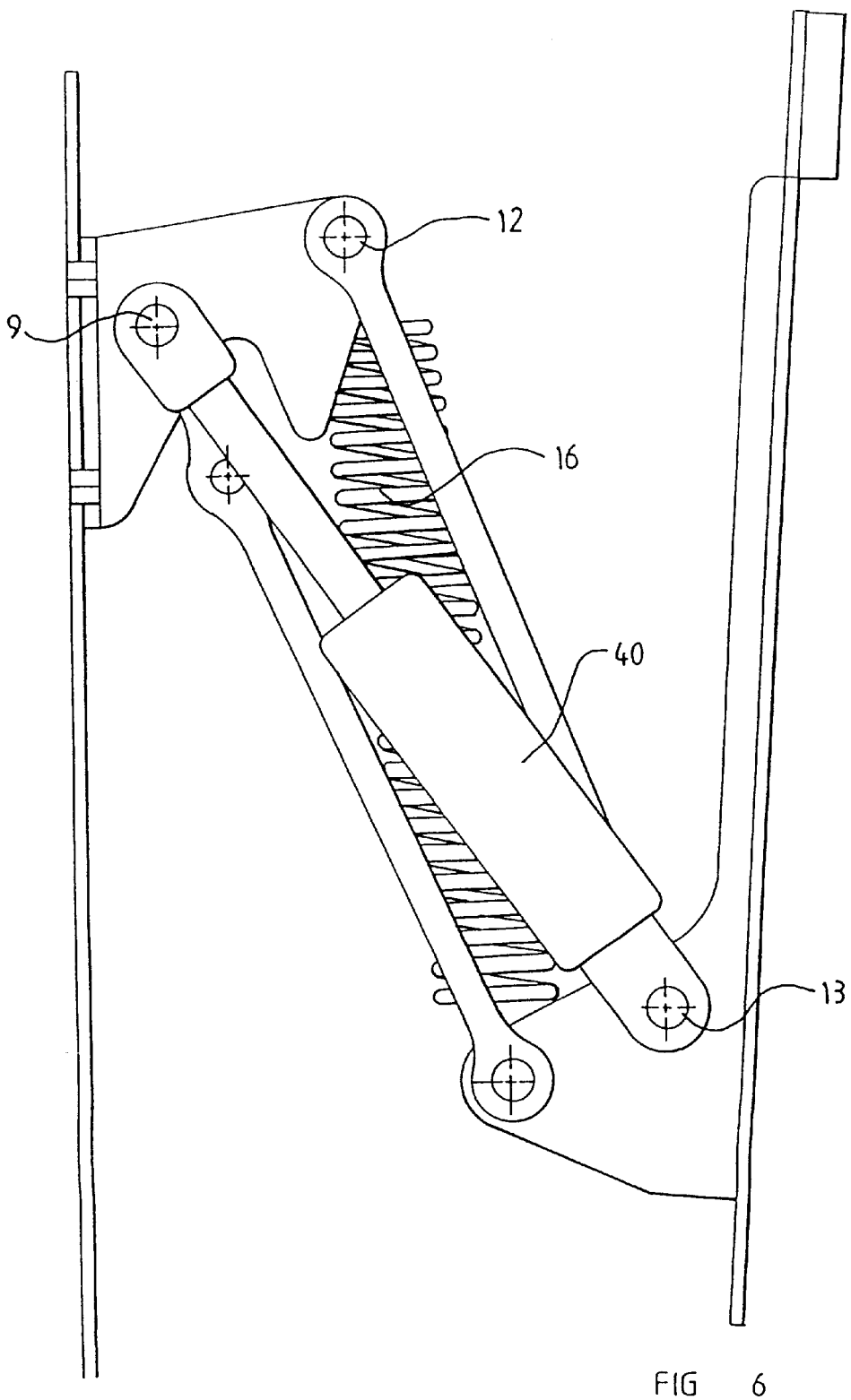
FIG. 6 is a view corresponding to FIG. 5 showing the arrangement in a subsequent stage of an accident situation.

The arrangement has the initial position illustrated in FIG. 4, and upon release of the catch 17, the spring 16 will tend to draw the point of pivotal connection 10 on the support plate 7 provided on the front part 3 of the head-rest towards the point of pivotal connection 12 between the upper end of the arm 11 and the support plate 5 provided on the rear part of the head-rest, thus causing the front part 3 of the head-rest to move forwardly. As the front part of the head-rest moves forwardly, so the hydraulic shock-absorber 40 expands and increases in length. The hydraulic shock-absorber 40 is adapted to expand freely in this direction, due to the presence of a relatively large one-way valve within the hydraulic shock-absorber. The apparatus thus has the condition illustrated in FIG. 5. As a pressure is applied to the front part 3 of the head-rest, the front part 3 of the head-rest moves rearwardly, and the hydraulic shock-absorber resists this movement, with fluid within the hydraulic shock-absorber passing through a small aperture. Energy applied to the front part of the head-rest is thus converted to heat within the hydraulic shock-absorber, and this energy is no longer available to apply a subsequent forward bias to the front part 3 of the head-rest.

Figure 7:
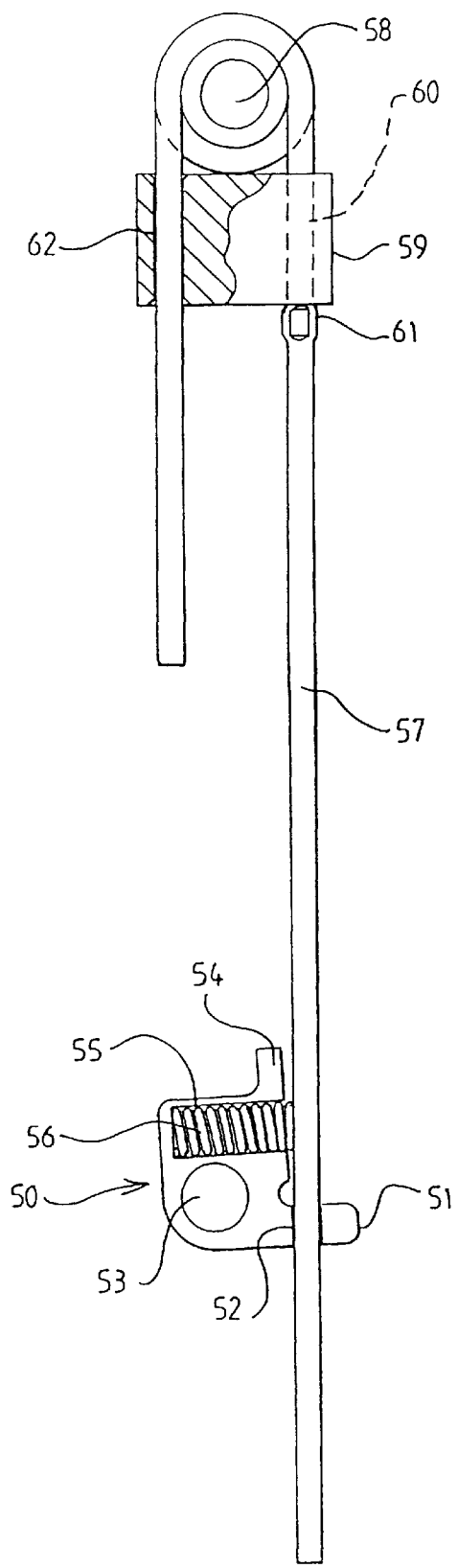
FIG. 7 is a schematic view of a modified energy absorber which is similar to that shown in FIGS. 1 to 3.

Turning now to FIG. 7, a modified energy-absorber is illustrated which is similar to the energy-absorber of the embodiment of FIGS. 1 to 3.

Thus the energy-absorber, as shown in FIG. 7, is intended to be used with a linkage of the type shown in FIGS. 1 to 3.

In the embodiment illustrated in FIG. 7, a blocking element 50 is provided which is equivalent to the block element 20 of the embodiment of FIGS. 1 to 3. A blocking element 50 is provided with an initially substantially horizontally extending lug 51 which defines a vertically extending cylindrical passage 52. The blocking element is mounted for rotation about a pivot axis 53. The blocking element is provided with an upstanding guide or finger 54, and thus the blocking element 50 presents a face which extends substantially parallel with the passage 52, that front face being substantially in alignment with the side wall of the passage 52. Extending inwardly from the front face defined by the finger 54 and the rest of the blocking element 50 is an inwardly directed bore 55 which contains a compression spring 56. Thus the compression spring 56 emerges from the open end of the bore 55 within the face of the blocking element which is in alignment with the passage 52.

In the embodiment illustrated in FIG. 7, a rod 57 is provided (which is equivalent to the rod 25 of the embodiment of FIGS. 1 to 3), which extends through the cylindrical passage 52 as a sliding fit therein. The end of the spring 56 emerging from the bore 55 engages part of the rod 57. The rod 57 extends to and partly surrounds a guide element 58 in the form of a roller, the radially outer surface of the roller being provided with a groove adapted to receive the rod 57. The part of the rod which is extended around the roller extends downwardly parallel with the part of the rod located between the blocking element 50 and the roller. A guide block 59 is provided adjacent the roller 58. The guide block 59 has a first bore 60 through which part of the rod adjacent a stop 61 passes. The stop 61 is provided to enable the guide block to be mounted on the rod at the desired position. The guide block may be secured to the rod 57 in the region of the bore 60. The other end of the rod 57 passes slidably through a bore 62 formed in the guide block 59.

The arrangement shown in FIG. 7 will operate in a similar manner to that shown in FIGS. 1, 2, 3. If the head-rest moves forwardly, the rod 57 will move downwardly relative to the blocking element 50, and frictional engagement between the rod 57 and the passage 52 will tend to cause the blocking element 50 to rotate in a clockwise direction thus compressing the spring 56, but bringing the front face of the block 50 as partially defined by the finger 54 into alignment with the rod 57, thus bringing the rod 57 into alignment with the passage 52, consequently permitting the rod 57 to move relatively freely through the bore 52. However, if the rod 57 then commences an upward movement, any frictional effect between the rod 57 and the passage 52 will tend to cause the blocking element 50 to rotate in a counter-clockwise direction, which rotation is assisted by the effect of the spring 56. This will increase the frictional engagement between the passage 52 and the rod 57, and again the two elements will soon become jammed in the manner of drawer partly extended from a chest of drawers. When this occurs, as in the embodiment described with reference to FIGS. 1 to 3, the rod 57 will be drawn past the roller 58 with a substantial deformation of the rod, thus absorbing energy and converting energy into a form in which the energy is no longer available for re-use.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A head-rest arrangement for a seat of a motor vehicle, the head-rest comprising:
   a rear part adapted to be mounted on the seat;
   a front part releasably connected to the rear part, the front part being adapted to move forwardly relative to the rear part in response to a signal;
   means for resisting subsequent rearward movement of the front part, relative to the rear part, once the front part has moved forwardly relative to the rear part, the resisting means converting energy to a form in which the energy is no longer available to bias the front part forwardly again;
   releasable connection means for releasably connecting the front part of the head rest to the rear part in response to said signal, the releasable connection means including a mechanical linkage comprising two elongate link elements, each link element having one end thereof pivotally connected to the rear part of the head-rest and each link element having the other end thereof pivotally connected to the front pad of the head-rest; and
   biasing means for biasing the front part forwardly relative to the rear part.

2. The head-rest arrangement according to claim 1, and further including means for restricting a degree of forward movement of the front part of the head-rest.

3. The head-rest arrangement according to claim 1, and further including a sensor generating the signal in response to a rear impact.

4. The head-rest arrangement according to claim 1, wherein the link elements are initially substantially parallel.

5. The head-rest arrangement according to claim 1, wherein the biasing means comprise a resilient element extending between the rear part of the head-rest and the front part of the head-rest.

6. The head-rest arrangement according to claim 5, wherein the resilient element comprises a spring.

7. The head-rest arrangement according to claim 5, wherein the resilient element extends between the point of pivotal connection of one link element and the rear part of the head-rest, and the point of pivotal connection between the other link element and the front part of the head-rest.

8. The head-rest according to claim 1, wherein the resisting means comprise a deformable member, the deformable member being adapted to be deformed in response to rearward movement of the front part of the head-rest subsequent to the initial forward movement of the front part of the head-rest.

9. The head-rest arrangement according to claim 8, and further including a guide element mounted on one part of the head-rest, wherein the deformable member comprises an elongate member, which at least partly surrounds the guide element; and a retaining element mounted on the other part of the head-rest, wherein another part of the deformable member engages the retaining element.

10. The head-rest arrangement according to claim 9, wherein the guide element includes an outer surface which is of at least part-circular form, around which the deformable member passes, and the retaining element is adapted to releasably retain part of the deformable member.

11. The head-rest arrangement according to claim 10, wherein the retaining element comprises a pivotally mounted blocking element defining a passage through which the elongate deformable member passes, and guide means, the pivotally mounted blocking element being associated with means providing a rotational bias, wherein movement of the deformable member through the passage tends to rotate the pivotally mounted blocking element to such a position that the guide means engage the deformable member to guide the deformable member through the passage, and movement in the opposite direction facilitates a rotational movement of the blocking element to a position in which there is frictional engagement between the deformable member and the passage.

12. The head-rest arrangement according to claim 11, wherein the means providing a rotational bias comprise a hook and a spring extending from the blocking element to the hook.

13. The head-rest arrangement according to claim 11, wherein the means providing a rotational bias comprise a spring within a bore in the blocking element, with one end of the spring engaging the deformable member.

14. The head-rest arrangement according to claim 1, wherein the resisting means comprise a hydraulic shock-absorber.

* * * * *